United States Patent [19]
Zimmerman

[11] Patent Number: 6,107,936
[45] Date of Patent: *Aug. 22, 2000

[54] ELECTRONIC PRICE LABEL SYSTEM INCLUDING AN ELECTRONIC PRICE LABEL FOR ATTRACTING CUSTOMERS

[75] Inventor: Terry L. Zimmerman, Lawrenceville, Ga.

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/902,024

[22] Filed: Jul. 29, 1997

[51] Int. Cl.[7] .................................................. G06F 7/04
[52] U.S. Cl. .............................. 340/825.35; 340/825.49; 340/825.52; 340/573.1; 714/704
[58] Field of Search .................. 340/825.35, 825.49, 340/825.52, 573.1; 714/704

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,651,150 | 3/1987 | Katz et al. | 340/825.34 |
| 4,912,457 | 3/1990 | Ladd | 340/573.1 |
| 4,924,363 | 5/1990 | Kornelson | 362/125 |
| 4,962,466 | 10/1990 | Revesz et al. | 364/518 |
| 5,172,314 | 12/1992 | Poland et al. | 364/401 |
| 5,241,467 | 8/1993 | Failing et al. | 364/401 |
| 5,245,534 | 9/1993 | Waterhouse et al. | 364/404 |
| 5,295,064 | 3/1994 | Malec et al. | 364/401 |
| 5,387,993 | 2/1995 | Heller et al. | 359/155 |
| 5,406,271 | 4/1995 | Sonnendorfer et al. | 340/825.35 |
| 5,448,226 | 9/1995 | Failing, Jr. et al. | 340/825.35 |
| 5,450,070 | 9/1995 | Massar et al. | 340/825.35 |
| 5,505,473 | 4/1996 | Radcliffe | 280/79.2 |
| 5,528,232 | 6/1996 | Verma et al. | 340/825.54 |
| 5,539,393 | 7/1996 | Barfod | 340/825.52 |
| 5,548,282 | 8/1996 | Escritt et al. | 340/825.35 |
| 5,565,858 | 10/1996 | Guthrie | 340/825.35 |
| 5,663,963 | 9/1997 | Goodwin, III et al. | 714/704 |
| 5,841,365 | 11/1998 | Rimkus | 340/825.52 |
| 5,914,670 | 6/1999 | Goodwin, III et al. | 340/825.52 |

*Primary Examiner*—Michael Horabik
*Assistant Examiner*—Yves Dalencourt
*Attorney, Agent, or Firm*—Paul W. Martin; Peter H. Priest

[57] ABSTRACT

An electronic price label (EPL) system including an EPL for attracting customers which uses a noisemaker to make noise during special promotions. The system includes an EPL associated with an item including a noisemaker, and an EPL computer which transmits a command to the EPL to activate the noisemaker during a special promotion of the item. The EPL computer may also transmit a command to display a promotional message to the EPL.

18 Claims, 4 Drawing Sheets

6,107,936

ELECTRONIC PRICE LABEL SYSTEM INCLUDING AN ELECTRONIC PRICE LABEL FOR ATTRACTING CUSTOMERS

BACKGROUND OF THE INVENTION

The present invention relates to electronic signage, and more specifically to an electronic price label (EPL) system including an EPL for attracting customers.

Electronic price label (EPL) systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

During special sales promotions, EPL systems display promotional messages using paper shelf talkers or bibs. However, these shelf talkers must be installed manually, thereby increasing the cost and setup time associated with special promotions. In addition, paper shelf talkers may be ineffective in attracting customers when used alone.

Therefore, it would be desirable to provide an electronic price label system including an EPL for attracting customers which uses sound or sound in combination with a displayed promotional message to attract customers.

SUMMARY OF THE INVENTION

In accordance with the teachings of the present invention, an electronic price label (EPL) system including an EPL for attracting customers is provided.

The system includes an EPL associated with an item including a noisemaker, and an EPL computer which transmits a command to the EPL to activate the noisemaker during a special promotion of the item. The EPL computer may also transmit a command to display a promotional message to the EPL.

A method of attracting customers to an item during a special promotion of the item includes the steps of providing an electronic price label (EPL) including a noisemaker, associating the EPL with the item, transmitting a message addressed to the EPL containing a command to activate the noisemaker during the special promotion, and activating the noisemaker by the EPL during the special promotion. The method may additionally include the step of displaying a promotional message by the EPL during the special promotion.

It is accordingly an object of the present invention to provide an EPL system including an EPL for attracting customers.

It is another object of the present invention to provide an EPL system including an EPL for attracting customers which uses sound.

It is another object of the present invention to provide an EPL system including an EPL for attracting customers which uses sound in combination with a displayed promotional message.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
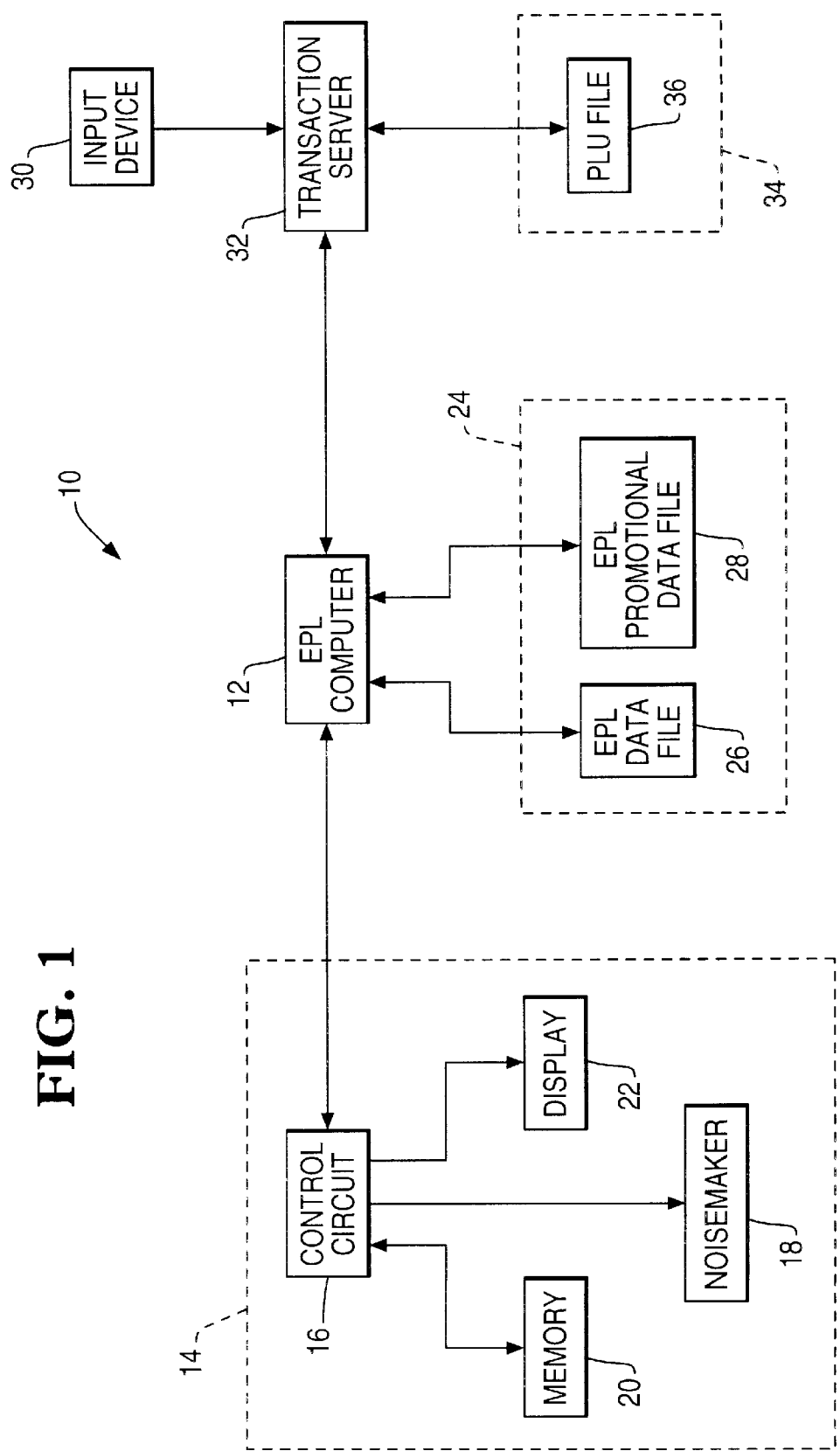
FIG. 1 is a block diagram of a store system.

Referring now to FIG. 1, store system 10 includes electronic price label (EPL) computer 12 and EPL 14. EPL computer 12 and EPL 14 may communicate with each other using wireless communication, cable communication, or a combination of both.

EPL computer 12 records, schedules, and transmits all messages to EPL 14 and analyzes status messages from EPL 14. Messages from EPL computer 12 include price change messages and diagnostic messages.

EPL computer 12 transmits a message containing a promotional message from either EPL data file 26 or EPL promotional data file 28. In the former case, a promotional message is associated with an EPL by storing it in the EPL's record in EPL data file 26. EPL computer 12 reads EPL data file 26 and sends the promotional message to the EPL.

In the latter case, a promotional message and a unique promotional indicator are stored within EPL promotional data file 28, as shown below in table I:

TABLE I

| Indicator | Promotional Message |
|---|---|
| 00 | (No message) |
| 01 | (No icon) |
| 02 | BUY TWO/GET TWO (blinking) |
| 03 | EVERDAY LOW PRICE |
| 04 | (Both of Messages 01 and 03 displayed) |

The indicator is stored within the associated item's price look-up (PLU) file 36. EPL computer 12 reads PLU file 36, obtains the promotional indicator from the item's record, retrieves the associated promotional message from EPL promotional data file 28, and sends the promotional message to the EPL.

Promotional messages may include text and/or graphic images, such as promotional icons, which are typically found on paper shelf talkers. Control circuit 16 may display price separately, or as an integral part of a promotional message.

EPL computer 12 maintains and uses EPL data file 26, which additionally contains item information, identification information, item price verifier information, and status information for EPL 14 and other EPLs within system 10.

Storage medium 24 stores EPL data file 26 and EPL promotional data file 28, when used.

EPL 14 is one of many EPLs within system 10. EPL 14 includes control circuit 16, noisemaker 18, memory 20, display 22.

Control circuit 16 controls the internal operation of EPL 14. Control circuit 16 stores received messages from EPL computer 12 and transmits response messages to EPL computer 12. Control circuit 16 controls generation of noise by noisemaker 18 and the display of price and promotional messages, including blinking.

Upon receiving a first type of message containing a promotional message, control circuit 16 stores the promotional message in memory 20, and displays the promotional message using display 22. Upon receiving a second type of message containing a promotional message, control circuit 16 stores the promotional message in memory 20, and displays the promotional message using display 22, and activates noisemaker 18. Finally, upon receiving a third type of message not containing a promotional message, control circuit 16 activates noisemaker 18. Activation of noisemaker 18 is preferably controlled by storing an "add noise" setting in EPL data file 26. Price is typically included with all messages, but may not be included if it does not change.

For the second and third types of messages, noisemaker 18 makes a sound which is audible to a customer who is not in the immediate vicinity of the associated EPL. The noise indicates to the customer that an item is being specially promoted and allows the customer to "home in" on the location of the EPL and the item. Thus, use of noisemaker 18 is able to attract the attention of more customers at any given time than a displayed promotional message. For the second type of message, the customer views the promotional message displayed by the EPL after the customer arrives at the EPL.

Noisemaker 18 is preferably a self-contained, electronic beeper, however, more elaborate noisemaking systems are also envisioned, including systems which electronically produce speech. When a plurality of EPLs produce noise, control settings for the noise, volume, period, and pitch may be added by an operator to the messages sent to the EPLs.

Memory 20 stores promotional messages and other data necessary for the proper operation of system 10.

Display 22 displays price and promotional messages. Display 22 is preferably a liquid crystal display (LCD).

Transaction server 32 is a host to a plurality of transaction terminals and its primary function is to provide price and item information to the transaction terminals from PLU file 36. Transaction server 32 and EPL computer 12 may also be one computer.

When promotional indicators are employed, PLU file 36 contains promotional indicators for preselected items. Promotional indicators may be added to PLU file 36 by an operator using input device 30. Input device 30 may be a keyboard or other suitable input device.

Storage medium 34 contains PLU file 36.

Figure 2:
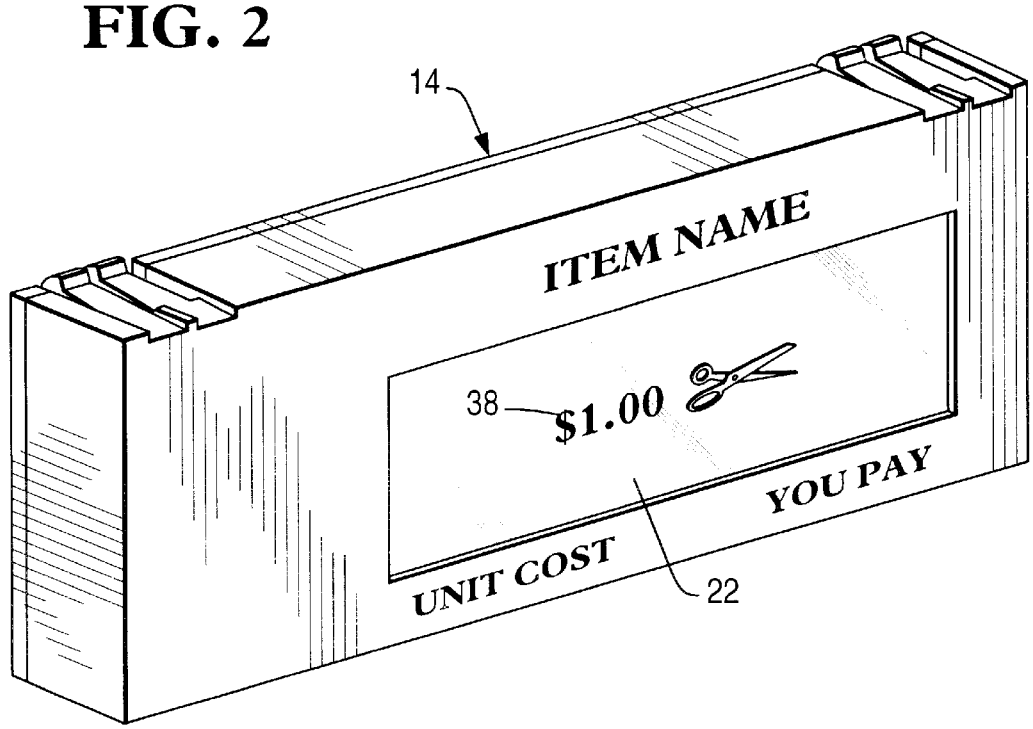
FIG. 2 is a perspective view of an EPL displaying a promotional icon.

Turning now to FIG. 2, EPL 14 is shown in more detail. The promotional message 38 is shown as a scissors icon and is associated with promotional indicator "01".

Figure 3:
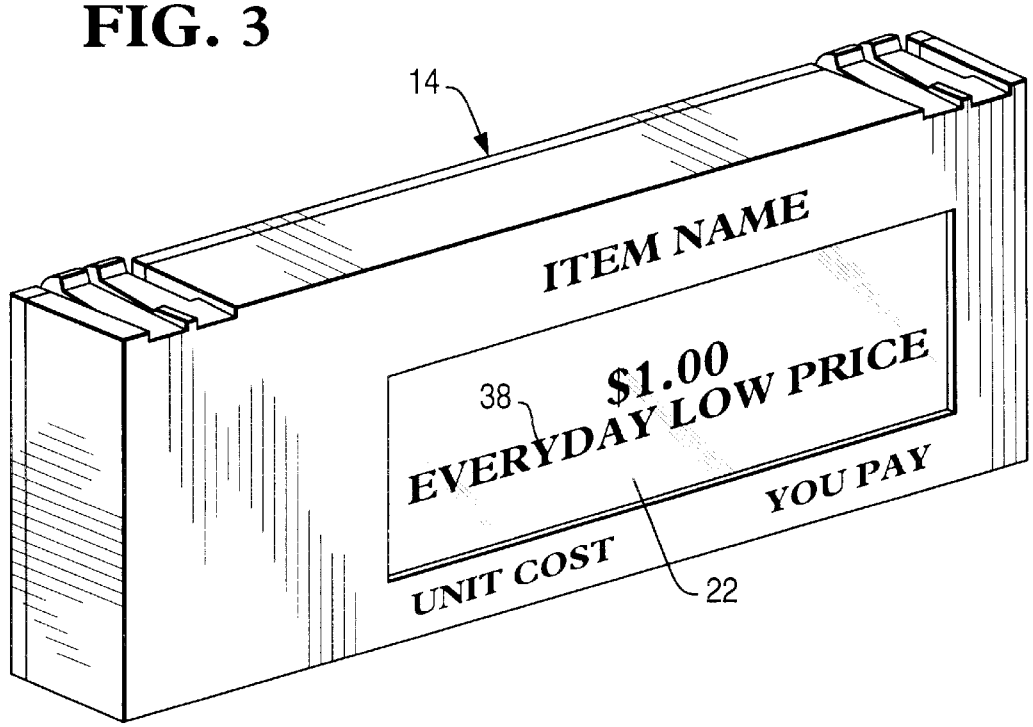
FIG. 3 is a perspective view of an EPL displaying a promotional message.

Turning now to FIG. 3, EPL 14 is displaying promotional message "Everyday Low Price", which is associated with promotional indicator "03".

Figure 4:
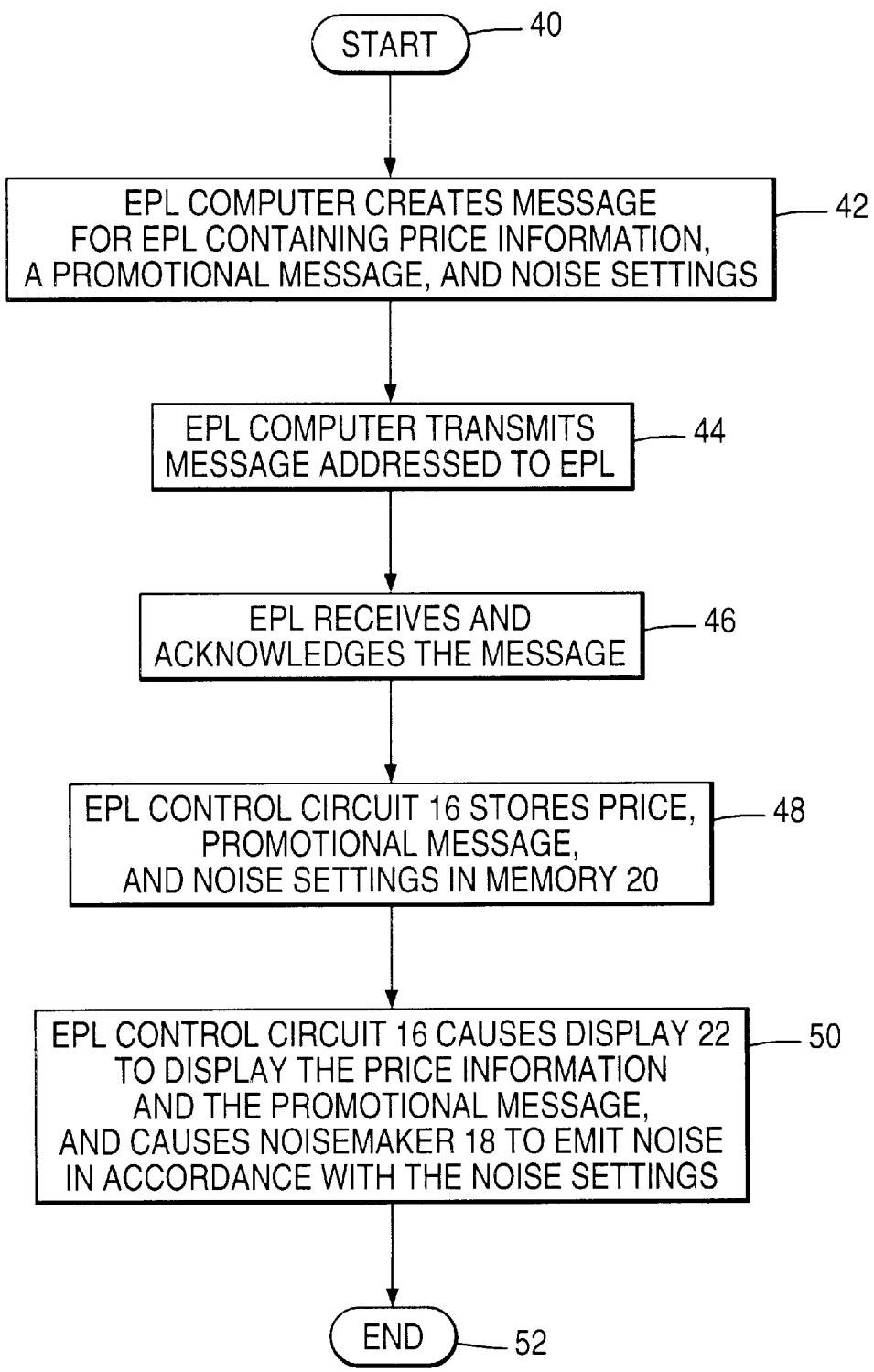
FIG. 4 is a flow diagram illustrating a first method of attracting customers.

Turning now to FIG. 4, a first method of attracting customers to a specially promoted item begins with START 40.

In step 42, EPL computer 12 creates a message for EPL 14 containing price information, a promotional message, and noise settings.

In step 44, EPL computer 12 transmits the message addressed to EPL 14.

In step 46, EPL 14 receives and acknowledges the message.

In step 48, control circuit 16 stores the price information, promotional message, and noise settings in memory 20.

In step 50, control circuit 16 causes display 22 to display the price information and the promotional message, and causes noisemaker 18 to emit a noise in accordance with the noise settings.

In step 52, the method ends.

Figure 5:
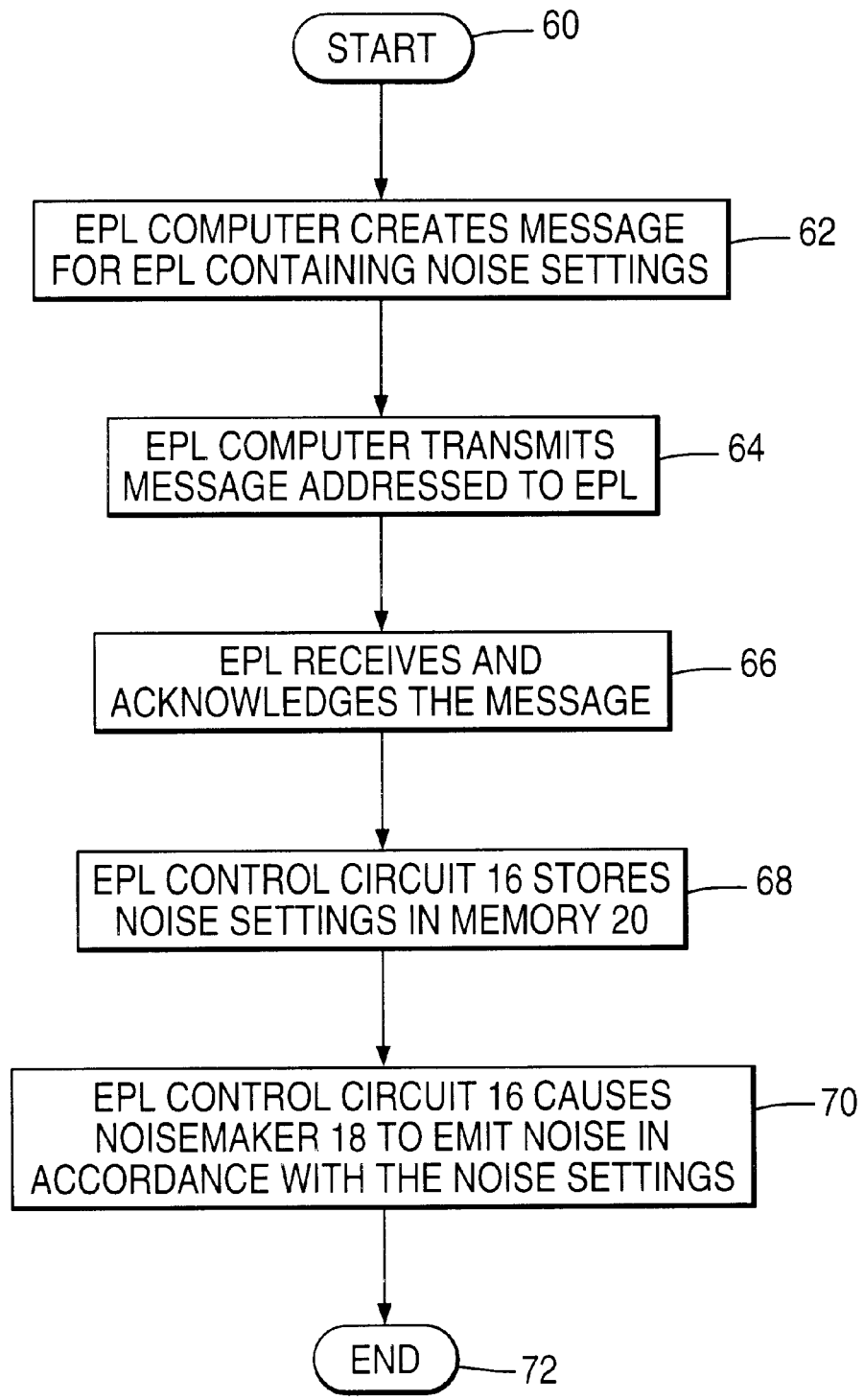
FIG. 5 is a flow diagram illustrating a second method of attracting customers.

Turning now to FIG. 5, a second method of attracting customers to a specially promoted item begin with START 60.

In step 62, EPL computer 12 creates a message for EPL 14 containing noise settings.

In step 64, EPL computer 12 transmits the message addressed to EPL 14.

In step 66, EPL 14 receives and acknowledges the message.

In step 68, control circuit 16 stores the noise settings in memory 20.

In step 70, control circuit 16 causes noisemaker 18 to emit a noise in accordance with the noise settings.

In step 72, the method ends.

Although the present invention has been described with particular reference to certain preferred embodiments thereof, variations and modifications of the present invention can be effected within the spirit and scope of the following claims.

What is claimed is:

1. An electronic price label (EPL) system comprising:
    an EPL associated with an item the EPL including a noisemaker;
    an EPL computer which transmits a command to the EPL to activate the noisemaker during a special promotion of the item;
    wherein the EPL activates the noisemaker in response to the transmitted command from the EPL computer during the special promotion of the item.

2. The system as recited in claim 1, wherein the EPL computer also transmits a command to display a promotional message to the EPL.

3. A method of attracting customers to an item during a special promotion of the item comprising the steps of:
    providing an electronic price label (EPL) including a noisemaker;
    associating the EPL with the item;
    transmitting a message addressed to the EPL containing a command to activate the noisemaker during the special promotion; and
    activating the noisemaker by the EPL during the special promotion.

4. A method of attracting customers to an item during a special promotion of the item comprising the steps of:
    providing an electronic price label (EPL) including a noisemaker and a display;
    associating the EPL with the item;
    transmitting a message addressed to the EPL containing a promotional message and a command to activate the noisemaker during the special promotion;
    displaying the promotional message by the EPL during the special promotion; and
    activating the noisemaker by the EPL during the special promotion.

5. An electronic price label (EPL) comprising:
    a noisemaker for attracting customers to a specially promoted item associated with the EPL;
    a display for displaying price information associated with a specially promoted item;

a memory for storing information received from a computer for controlling the noisemaker and the display; and a control circuit coupled to the noisemaker, the memory, and the display for activating the noisemaker in accordance with the information in the memory.

6. The EPL as recited in claim 5, wherein the memory also stores promotional messages received from the computer, and wherein the control circuit causes the display to display the promotional message.

7. An electronic price label (EPL) system comprising:

a plurality of EPLs;

an EPL computer for transmitting messages to the plurality of EPLs, said messages including price change messages and diagnostic messages;

wherein each of the plurality of EPLs is associated with an item, each of the plurality of EPLs including:
- a noisemaker for attracting customers to a specially promoted item associated with the EPL;
- a display for displaying price information associated with a specially promoted item;
- a memory for storing information received from the EPL computer for controlling the noisemaker and the display; and
- a control circuit coupled to the noisemaker, the memory, and the display for activating the noisemaker in accordance with the information in the memory; and wherein the EPL computer transmits a noisemaker command to one of the plurality of EPLs to activate the noisemaker during the special promotion of the item.

8. The electronic price label system of claim 7 wherein:
said noisemaker command includes a volume setting of the noisemaker.

9. The electronic price label system of claim 7 wherein:
said noisemaker command includes a period setting of the noisemaker.

10. The electronic price label system of claim 7 wherein:
said noisemaker command includes a pitch setting of the noisemaker.

11. The electronic price label system of claim 7 wherein:
said noisemaker command includes a promotional message.

12. The electronic price label system of claim 11 wherein:
said one of the plurality of EPLs displays the promotional message.

13. The electronic price label system of claim 7 wherein:
said noisemaker command includes price information.

14. The electronic price label system of claim 7 wherein:
the price information is stored in a price look-up (PLU) file.

15. The electronic price label system of claim 7 wherein:
activation of the noisemaker is controlled by storing an add noise setting in an EPL data file.

16. The electronic price label system of claim 7 wherein:
the EPL computer creates the noisemaker command containing noise settings.

17. The electronic price label system of claim 16 wherein:
the noisemaker command is addressed to the one of the plurality of EPLs.

18. The electronic price label system of claim 17 wherein:
the one of the plurality of EPLs stores the noise settings in the memory.

* * * * *